TRANSMISSION LINE TERMINATING IMPEDANCE DISTINGUISHING CIRCUIT

Filed Jan. 13, 1961

INVENTORS
BARRIE BRIGHTMAN
J CARTER PERKINS, JR.
RICHARD SCOTT
BY
George W. Killian
AGENT United States Patent Office 3,119,063
Patented Jan. 21, 1964

3,119,063
TRANSMISSION LINE TERMINATING IMPEDANCE DISTINGUISHING CIRCUIT

Barrie Brightman, Webster, J Carter Perkins, Jr., Victor, and Richard Scott, Rochester, N.Y., assignors to General Dynamics Corporation, Rochester, N.Y., a corporation of Delaware Filed Jan. 13, 1961, Ser. No. 82,621
10 Claims. (Cl. 324—58)

Figure 2:
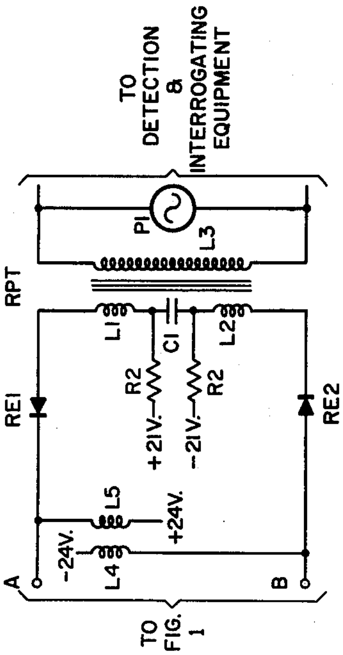

This invention relates in general to transmission lines and, more particularly, to means for obtaining a signal at one end of a transmission line which is indicative of the high or low terminating impedance at the other end of the transmission line when the transmission line is long enough to exhibit substantially its characteristic impedance.

Although the invention described herein is suitable for more general application, it is particularly suitable for use in an electronic telephone switching system. In any telephone system employing subscriber operated pulse generators, such as dials, there is a need to include equipment in the central office which can differentiate between the opened and closed condition of the pulsing contacts of the dial at all times. In addition, the detection equipment must be capable of determining the on- or off-hook condition of a telephone connected to a given line. As is well known to those familiar with the telephone art, dial pulses, as seen from the central office, are substantially the same as alternate on- and off-hook signals. Therefore, the major requirement of the referenced detector circuit is to detect if a telephone connected to a particular line appears to have an on- or off-hook condition. Conventional telephone systems, such as those widely used today, employ a relay which is capable of pulsing at dial speeds for detecting and responding to dial pulses. These relays are bulky, expensive, and require occasional adjustment. Accordingly, it was desired to develop a new, economical and convenient system for determining the on- or off-hook condition of the calling station without requiring the use of electromechanical devices. Such techniques have been developed and are illustrated in the United States patent application of Brightman et al., Serial No. 78,091, filed December 23, 1960, wherein an off-hook detector is disclosed which determines the on- or off-hook condition of the line by determining the impedance condition of the line as reflected to a line transformer. The system shown in the referenced application works very well on short lines. However, the techniques shown in the referenced application will not operate satisfactorily with subscriber lines which are long enough to exhibit substantially their characteristic impedance, as a long line will appear to be terminated with its characteristic impedance irrespective of whether the line is either open-circuited or short-circuited.

Accordingly, it is an object of this invention to provide a new and improved means for obtaining a signal at one end of a transmission line indicative of the high or low terminating impedance at the other end of the transmission line.

It is a more particular object of this invention to provide signals at one end of a transmission line indicative of the high or low terminating impedance at the other end of the transmission line when the transmission line is long enough to exhibit substantially its characteristic impedance at the frequency of the interrogating signal.

In accordance with the present invention, as applied to an electronic telephone switching system, each cable pair is coupled to the electronic switching equipment through a transformer, or a repeat coil as it is more commonly called in telephone parlance. For a short line, the on- or off-hook condition thereof may be ascertained by applying an interrogating, or reference, potential of known frequency and potential to the equipment side of the repeat coil and measuring the resultant current. That is, if the line is terminated in a short circuit, or in telephone parlance, if the line is off-hook, a low impedance condition will be reflected to the repeat coil, thereby resulting in a relatively large current; while if the line is on-hook, a high impedance condition will be reflected to the repeat coil, thereby resulting in a relatively small current. However, for a line which is long enough to exhibit its characteristic impedance, it is impossible to use the above outlined techniques as the line will reflect its characteristic impedance to the transformer irrespective of the termination at the distant end of the line. For improved transmission, loading coils are frequently included in telephone lines. The loading coils merely add inductance to the lines but have the effect of making the characteristic impedance of a line nearly independent of the frequency of the applied potential. Typical telephone lines exhibit substantially their characteristic impedance when only approximately one mile long. Since many telephone lines extend a few miles from the central office, special techniques must be employed to determine the terminating impedance.

The characteristic impedance of a line is defined as the ratio of an applied potential difference to the resultant current at the point where the potential difference is applied when the line is of infinite length. That is, for a line of infinite length, the impedance will be found to depend entirely upon the characteristics of the line itself and will not be affected by what, if anything, is connected to the far end of the line. The characteristics of the line which determine the characteristic impedance include the distributed resistance, inductance, and capacitance of the line which, in turn, are a function of the wire size, material spacing, and insulation. Practical measurements have shown that pairs of wire in a typical telephone cable will exhibit substantially their characteristic impedance when the cable is approximately one mile long. The present invention provides a means for reflecting first and second different and distinct impedances to a repeat coil connected to one end of the line in response to first and second different terminating impedances being connected to the other end of the line irrespective of the fact that the line is of sufficient length to exhibit its characteristic impedance. In order to carry out this invention, means are provided for responding to a change in direct current in the line as a result of the change in terminating impedance, to cause a distinctive impedance, other than the characteristic impedance of the line, to be reflected to the repeat coil for at least one terminating condition. One embodiment of the invention employs unidirectional current passing devices which may be biased to conduction or non-conduction depending on the conditions at the terminating end of the line.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise four figures on one sheet.

It is to be understood that only the details of the circuit necessary to understand the invention have been shown. For example, means for applying A.C. reference potential P1 to the equipment side of the repeat coil has not been shown as it does not form a part of this invention and an inclusion thereof in these drawings would only tend to mask, or obscure, the inventive features disclosed herein. For a suitable means of applying a reference or interrogating potential, reference may be had to the cited application.

Figure 1:
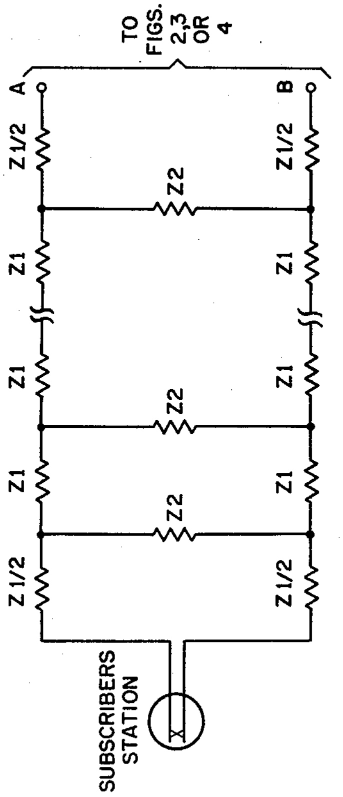

It is believed that the operation of this invention can best be understood by describing the operation of a system employing the invention. For this purpose, FIGURE 1, which illustrates a transmission line, should be considered. The transmission line, which may be assumed to be made of uniform sections of wire, has distributed resistance, inductance, and capacitance in series and/or shunt. Z1 represents the series impedance for each section of a given length of the line, and Z2 represents the shunt impedance for each section of the line. If the line is assumed to have an infinite number of such sections, then, by definition, all the distributed impedance may be replaced by a single equivalent impedance which is known as the characteristic impedance and is usually designated $Z_0$. That is, the characteristic impedance is the single equivalent impedance which will permit the same current to flow from a source of A.C. potential coupled to the transmission line as would flow if the transmission line of infinite length were coupled directly to the A.C. potential source. Naturally, the value of the characteristic impedance will vary with the frequency of the applied potential as well as with the wire size, material, and spacing. It is particularly important to note that the impedance terminating the infinite line, whether it be inductive, capacitive, zero, or infinite, will in no manner affect the impedance of the line as seen from the other end. The characteristic impedance of a line may be calculated from the following formula:

$$Z_0=\sqrt{\frac{R+jwL}{G+jwC}}$$

where:

$R$=the resistance in ohms per unit length of the line,
$L$=the inductance in henrys per unit length of the line,
$G$=the conductance in mhos per unit length of the line, and
$C$=the capacitance in farads per unit length of the line.

For typical telephone type cable, it has been found that the impedance of the cable pair at one thousand cycles is substantially equal to the characteristic impedance when the cable pair is approximately one mile long. Inasmuch as many telephone cables extend for a few miles, it is very common to encounter lines of sufficient length to exhibit their characteristic impedance.

FIGURE 2 illustrates one embodiment of the invention which may be coupled to a transmission line for reflecting an impedance signal at one end of the transmission line which is indicative of the on- or off-hook condition at the other end of said transmission line even when the transmission line is well over the length wherein it appears to be terminated in its characteristic impedance regardless of the actual termination. If it is assumed that the line is, in fact, open-circuited, that is, that the subscriber's telephone is on-hook, then there will be no D.C. current flow from the +24 volt D.C. potential source through inductor L5 down the transmission line on one line, through the hookswitch and dial at the subscriber's station, and back on the other line through inductor L4 to the −24 volt D.C. potential. Accordingly, the left-hand terminals of diodes RE1 and RE2 will be at a potential of +24 volts D.C. and −24 volts D.C., respectively. In a similar manner, the right-hand terminals of diodes RE1 and RE2 will be at +21 volts D.C. and −21 volts D.C., respectively. Diodes RE1 and RE2 are well known devices which will pass conventional (not electron) current in only one direction; namely, from anode to cathode and only when the anode is positive with respect to the cathode. The anode of the diode is conventionally represented by the triangle while the cathode is represented by the vertical line at the point of the triangle. Thus, with the described conditions, the anode of each diode is negative with respect to its cathode and conduction does not take place. Of course, a small D.C. current will flow from the positive and negative 24 volt D.C. source through the leakage resistance between the two conductors of the cable pair. Accordingly, the leakage resistance between the two conductors must be limited to a value of substantially more than the loop resistance of the transmission line. For years, telephone standards have considered a ten thousand ohm leakage resistance to be the minimum acceptable value. In practice, the leakage resistance of most lines is usually substantially greater than fifty thousand ohms.

When the distant end of a transmission line connected to the circuit configuration of FIGURE 2 is open-circuited, no current passes through diodes RE1 and RE2. Therefore, if an A.C. potential source P1 is connected across the terminals of inductor L3, which form a part of repeat coil RPT, the resultant current in coils L1 and L2 of the repeat coil will be substantially zero as no current can pass through the diodes RE1 and RE2 since they are back biased. Naturally, the described condition obtains only as long as the potential induced in coils L1 and L2 is not large enough to raise the anodes of the diodes to a potential which is positive with respect to the cathode. Therefore, with the transmission line open-circuited, an infinite impedance is reflected to winding L3 of the repeat coil in FIGURE 2.

When the transmission line connected to the termination shown in FIGURE 2 is short-circuited at the far end, a D.C. current will flow from the positive and negative 24 volt D.C. power source and the resultant IR drop in inductors L4 and L5 will cause a change in the bias potential appearing at the left-hand terminals of diodes RE1 and RE2. The exact potential at these terminals will depend upon the loop resistance of the cable pair and the resistance of inductors L4 and L5. If it is assumed that the loop resistance of the transmission line will not exceed two thousand ohms and that inductors L4 and L5 have a resistance of approximately three hundred and fifty ohms and that resistors R2 are limited to about eight hundred ohms, it can be shown that the diodes will be biased to conduction when the transmission line is short-circuited and will not be biased to conduction when the transmission line is open-circuited even with a leakage resistance as low as ten thousand ohms between the conductors of the transmission line. If the resistance of inductors L4 and L5 is made too low, the forward bias applied to the diodes will be inadequate, while, if the resistance of inductors L4 and L5 is made too large, the back bias of the diodes will be inadequate when there is a low leakage resistance. Permitting resistors R2 to be too small will cause the D.C. line current to be too large. Accordingly, it is necessary to choose potential and resistor values and limitations with the cited consequences in mind. Naturally, values other than those suggested could be used without departing from the spirit of the invention.

Accordingly, with properly chosen potentials and resistor values, the diodes RE1 and RE2 of FIGURE 2 will be forward biased when the distant end of the transmission line is short-circuited. When A.C. potential P1 is applied across the terminals of winding L3 of repeat coil RPT, and A.C. potential will be induced in windings L1 and L2. Since the diodes are biased to conduction, an A.C. current will flow through the transmission line. The resultant impedance that is reflected to the repeat coil will be the impedance of the transmission line which will be the characteristic impedance if the transmission line is long enough.

In summary, FIGURE 2 illustrates a means for reflecting either the characteristic impedance of a transmission line, or an infinite impedance, to a winding of a repeat coil in response to the distant end of the transmission line being short-circuited or open-circuited, respectively.

Figure 3:
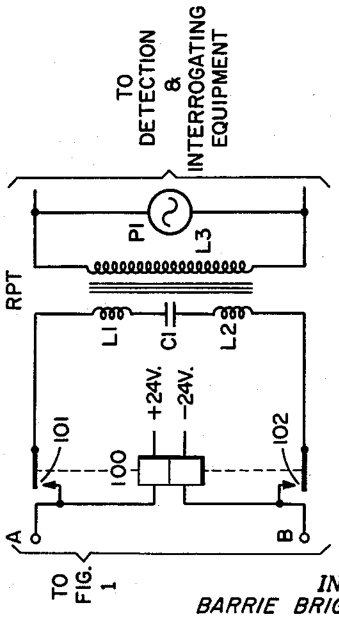

The circuit of FIGURE 3 functions in much the same manner as that shown in FIGURE 2. However, in FIGURE 3, the inductors L4 and L5 of FIGURE 2 are replaced by relay windings on a relay designated 100, while the diodes RE1 and RE2 of FIGURE 2 are replaced by normally open contacts 101 and 102 of relay 100. Resistors R2 and the positive and negative 21 volt D.C. potential may be eliminated as it is no longer necessary to provide bias potentials to any diode. Thus, the circuit of FIGURE 3 uses relay 100 to respond to open and short circuit conditions at the distant end of a long transmission line. In response to an open circuit condition at the far end of the transmission line, relay 100 will not be operated and, therefore, contacts 101 and 102 will be open, thereby presenting an infinite impedance to the repeat coil. When the transmission line is short-circuited at the far end, the impedance of the transmission line, which is the characteristic impedance if the transmission line is long enough, is reflected to the repeat coil. Capacitor C1 is required in the circuit of FIGURE 3 in order to avoid having relay 100 held operated through its own contacts in series with windings L1 and L2 of the repeat coil when relay 100 operates in response to a short circuit condition at the far end of the transmission line.

Figure 4:
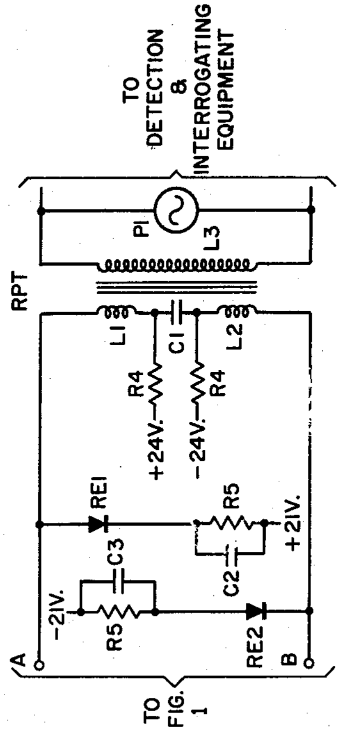

The circuit of FIGURE 4 shows another embodiment of the invention which permits two distinctively different impedances to be reflected to the repeat coil in response to the open or short circuit conditions at the far end of a transmission line. It will be shown that with the circuit of FIGURE 4 the open circuit condition is reflected as a short circuit, or zero impedance, while the short circuit condition is reflected as the characteristic impedance, or the impedance of the transmission line.

With the potentials, as shown in FIGURE 4, it is evident that the diodes RE1 and RE2 will be forward biased when the connected transmission line is open-circuited as there will be practically no D.C. current in the resistors R4. That is, the anode of each diode will be positive with respect to its cathode. Accordingly, if an A.C. potential is applied to the terminals of winding L3 of the repeat coil RPT, a zero impedance will be reflected thereto as a virtually zero impedance condition exists between points A and B as diodes RE1 and RE2 are forward biased and capacitors C2 and C3 provide a low impedance A.C. circuit.

When the transmission line connected to FIGURE 4 is short-circuited, a D.C. current will flow in the transmission line and the resultant higher drop in resistors R4 will cause diodes RE1 and RE2 to be back biased. Under these conditions, the impedance of the transmission line will be reflected to the repeat coil when A.C. potential P1 is applied to winding L3.

In order to assure proper forward and back biasing of the diodes, the values of the resistors must be carefully selected. For telephone applications, resistors R4 may be approximately three hundred ohms and resistors R5 may be about one thousand ohms.

If desired, diodes RE1 and RE2 of FIGURE 4 could be reversed in direction, thereby causing transformer winding L3 to see a zero impedance when the transmission line is terminated with a short circuit and to see the characteristic impedance when the transmission line is terminated with an open circuit. For telephone applications, it is usually more useful to have the repeat coil see the characteristic impedance when the transmission line loop is closed.

It should be observed that instead of detecting the change between open circuit and short circuit conditions at the end of the transmission line, the present invention could be used to respond to impedance changes a predetermined amount greater and smaller than a reference impedance.

In summary, the present invention illustrates new and improved means for reflecting first and second predetermined impedance signals to one end of a transmission line in response to first and second distinctive impedance terminations at the other end of said transmission line even when said transmission line is long enough to exhibit its characteristic impedance.

Although the utility of the invention described above is shown in the telecommunication art, it should be understood that the invention, as described, or with modifications which will readily occur to those skilled in the art, will find utility in other arts without departing from the true spirit and scope of the principles employed in the present invention.

What is claimed and desired to be secured by Letters Patent of the United States is:

1. In a signaling system, a two-conductor transmission line having sufficient length to exhibit substantially its characteristic impedance at a predetermined frequency, transformer means coupled to one end of said transmission line, impedance terminating means coupled to the other end of said transmission line, means for selectively changing the impedance of said terminating means between first and second impedance values, and detecting means coupled to said transmission line at said one end for providing an A.C. isolation of said transmission line from said transformer and for reflecting a third impedance value to said transformer when said terminating means has said first impedance value and for reflecting a fourth impedance value to said transformer when said terminating means has said second impedance value.

2. The system as set forth in claim 1 wherein said detecting means comprises a source of direct current potential, and means for responding to the change of direct current in said transmission line when the impedance of said terminating means is changed from said first to said second impedance value.

3. The system as set forth in claim 2 wherein said third and fourth reflected impedance values are the characteristic impedance of said transmission line at said predetermined frequency and an infinite impedance, respectively.

4. The system as set forth in claim 2 wherein said third and fourth reflected impedance values are the characteristic impedance of said transmission line at said predetermined frequency and zero impedance, respectively.

5. In a signaling system, a transmission line having first and second conductors, a source of A.C. potential having a predetermined frequency, coupling means for coupling said A.C. potential to one end of said transmission line, said transmission line being of sufficient length to exhibit substantially its characteristic impedance at said predetermined frequency, impedance terminating means coupled to the other end of said transmission line, means for selectively changing the impedance of said terminating means between first and second terminating impedance values, a source of D.C. potential, means for coupling said D.C. potential to said transmission line at said one end in a manner to permit a first D.C. current to flow through said transmission line only when the other end of said transmission line is terminated with a selected one of said first and second terminating impedance values, said last named coupling means including first and second current passing devices coupled to said first and second conductors, respectively, of said transmission line at said one end thereof, and means for rendering said devices conductive only in response to the other end of said transmission line being terminated with a predetermined one of said first and second terminating impedance values.

6. The system as set forth in claim 5 wherein said predetermined terminating impedance value is said selected terminating impedance value.

7. The system as set forth in claim 5 wherein said predetermined terminating impedance value and said selected impedance value are not the same.

8. The system as set forth in claim 5 wherein said first and second terminating impedance values are short circuit and open circuit impedances, respectively.

9. The system as set forth in claim 8 wherein said predetermined terminating impedance and said selected terminating impedance are said first terminating impedance.

10. The system as set forth in claim 8 wherein said predetermined terminating impedance is said second terminating impedance and said selected terminating impedance is said first terminating impedance.

References Cited in the file of this patent

UNITED STATES PATENTS

| | | |
|---|---|---|
| 2,387,269 | Johnson | Oct. 23, 1945 |